Patented May 19, 1953

2,639,300

UNITED STATES PATENT OFFICE 2,639,300

PREPARATION OF FLUOROMETHANES

Robert P. Ruh and Ralph A. Davis, Midland, Mich., assignors to The Dow Chemical Company, Midland, Mich., a corporation of Delaware No Drawing. Application November 2, 1949, Serial No. 125,161

4 Claims. (Cl. 260—653)

This invention relates to the preparation of fluoro-substituted methanes, and, more particularly, to the preparation of chlorodifluoromethane and dichlorodifluoromethane.

Chlorodifluoromethane and dichlorodifluoromethane are two compounds having great utility as refrigerants and as carriers or propellants (e. g., for insecticides or for paints). Various methods have been disclosed for the preparation of these two compounds, but the commercial processes for their production involve (a) the fluorination of chloroform to produce chlorodifluoromethane, and (b) the fluorination of carbon tetrachloride to produce dichlorodifluoromethane.

Heretofore, no method for producing either chlorodifluoromethane or dichlorodifluoromethane by the chlorination of difluoromethane has been disclosed. Henne (J. Am. Chem. Soc. 59, 1201, (1937)) attempted the chlorination and bromination of a closely related compound, fluoroform; he reported that the bromination of fluoroform is not possible, and that the direct chlorination thereof is extremely difficult, and proceeds only in a quartz reactor and when the reactants are brilliantly illuminated. Apparently, such chlorination proceeds very slowly, and only in very low yields. Work of Henne published subsequent to the 1937 journal article identified above indicates that a $CF_3$— group hinders chlorination of an adjacent —$CH_2$— group and that a —$CF_2$— group similarly hinders the chlorination of an adjacent $CH_3$— group (see, for example, J. Am. Chem. Soc., 67, pages 1195, 1197 and 1906 (1945)). Accordingly, it seems to be indicated that —$CF_2$— and $CF_3$— groups are similar vis a vis chlorination in that either hinders the replacement of hydrogen by chlorine on carbons alpha to the —$CF_2$— or the $CF_3$— group. Therefore, the —$CF_2$— group would be expected to hinder the chlorination of difluoromethane as the $CF_3$— group hinders the chlorination of fluoroform.

The principal object of the present invention is to provide an improved method for producing dichlorodifluoromethane and chlorodifluoromethane. More specific objects and advantages are apparent from the specification which illustrates and discloses, but is not intended to limit the invention.

According to the invention, chlorofluoromethanes are produced by a method that comprises effecting a vapor phase chlorination of difluoromethane. Molecular chlorine is used as the chlorinating agent, and the chlorination is effected at a temperature between about 20° C. and the pyrolysis temperature under the conditions employed. A contact time not longer than about 75 seconds is used. Chlorodifluoromethane and dichlorodifluoromethane can be produced simultaneously by this method.

As has been indicated, the reaction of the invention is a vapor phase chlorination. This chlorination proceeds at temperatures as low as about 20° C., and at temperatures up to the pyrolysis temperature (i. e., the temperature at which either the difluoromethane starting material or one of the products undergoes thermal decomposition). It is usually preferred that the reaction be conducted at a temperature between about 100° C. and about 400° C. so that the reaction proceeds at a practical rate.

The contact time (i. e., the average time that a unit quantity of gas is in the reaction zone) that is used in carrying out a vapor phase chlorination of difluoromethane and the temperature at which the chlorination is conducted are interrelated. In general, if the reaction temperature is lower the contact time must be higher in order to achieve a given yield of the desired product. For example, if the chlorination is carried out at a temperature of about 50° C., it is usually desirable to use a contact time between about 55 seconds and about 65 seconds; if, on the other hand, a reaction temperature of 350° C. is used, a contact time between about 10 seconds and about 20 seconds is usually desired. It is ordinarily preferred to conduct the chlorination of the invention at a comparatively high temperature, using a relatively short contact time, because optimum utilization of the equipment is thus accomplished. Accordingly, it is preferred to use contact times of from about 1 second to about 25 seconds; such contact times are practical when the temperature at which the reaction is conducted is within the preferred range indicated above. Contact times of a fraction of a second are entirely feasible in the practice of the invention, and may, in some instances, be particularly advantageous. To produce chlorofluoromethanes according to the invention, and using a short reaction time, the reactants can be passed through a reaction zone in which heating may be very rapidly effected (e. g., one in which the available heating surface area is relatively large in comparison with the volume of the gas in the reactor). Under such conditions, if the reaction temperature is comparatively high, e. g., between about 400° C. and about 450° C., extremely short contact times are practicable, and are highly advantageous for the reason that the equipment cost of producing chlorofluoromethanes is minimized.

It is usually desired that the mol ratio of chlorine to difluoromethane be at least about 0.5:1, although chlorination proceeds in accordance with the invention with merely a trace of chlorine present (e. g., as little as one mol of chlorine per 10 mols of difluoromethane). Ordinarily, there is no reason to use more than about five mols of chlorine per mol of difluoromethane, and it is usually preferred to use from about 1 to about 2.5 mols of chlorine per mole of difluoromethane.

The reaction of the invention is conducted either batchwise or continuously. If reaction is conducted batchwise, the difluoromethane and chlorine are added to an evacuated flask which is then illuminated by a light source. However, it is preferred that the process be conducted continuously, because the reaction is more easily carried out continuously, and because better yields result. The reaction is conducted continuously in any convenient reaction vessel, and a tube is ordinarily adequate for the purpose. It is usually desirable that the tube, or other reaction vessel, be packed with a material inert to the reactants and to the products in order to increase the effective heat transfer surface.

Although it is not essential, it is usually desired to conduct the reaction so that the gases are subjected to the action of light. Sunlight is effective for this purpose, but an ordinary tungsten light bulb source, or ultraviolet light can also be used.

The following examples illustrate the new process, but are not to be construed as limiting the scope of the invention.

EXAMPLE 1

The following procedure was used to produce a chlorofluoromethane:

A Vycor tube having an internal diameter of one inch and an overall length of 32 inches was placed in an open-coil electric furnace. ("Vycor" glass contains from 90 to 96 per cent silica, and is made by the Corning Glass Works.) The internal length of the furnace was 24 inches, so that a 24 inch section of the Vycor tube was heated in the furnace; a 12-inch section of the Vycor tube was packed with chromic oxide pellets. The packing in the Vycor tube (which was approximately centered in the furnace) reduced the free space in the heated portion thereof to about 200 cc. The furnace was heated to maintain the temperature of the heated portion of the tube at about 300° C. (as estimated by determining the temperature of the outside of the tube with a chromel-alumel thermocouple). A mixture of difluoromethane (11 grams) and chlorine (34 grams) was passed through the heated tube. The effluent products were passed through water scrubbers, dried over anhydrous calcium sulfate, and condensed in receivers cooled by an acetone-Dry Ice mixture. The desired products were recovered by fractional distillation in a Podbielniak column; the fractionation yielded 9.1 grams of difluoromethane and 2.8 grams of chlorodifluoromethane.

A procedure similar to that described in the preceding paragraph was carried out using a tube temperature of 350° C., a contact time of 19 seconds, and a mol ratio of chlorine to difluoromethane of 3.1:1. The fractionation of the products yielded both dichlorodifluoromethane and chlorodifluoromethane, the mol ratio of the dichloro- to the monochloro-product being about 6:1.

The procedure of the first paragraph of the example was repeated using a tube temperature of 310° C., a contact time of 15 seconds, and a mol ratio of chlorine to difluoromethane of 2.3:1. The fractionation of the chlorination product yielded dichlorodifluoromethane and chlorodifluoromethane, the mol ratio of the dichloro- to the monochloro-product being 3.8:1.

EXAMPLE 2

The equipment used was the same as that described in the first paragraph of Example 1 except that the packing was removed from the Vycor tube. The tube was heated to a temperature of about 200° C., and a mixture of difluoromethane (34 grams) and chlorine (58 grams) was passed through the tube at such a rate that the contact time was about 39 seconds. During the chlorination, the tube was illuminated with a 200 watt, tungsten-filament light bulb filled with an inert gas. The chlorination products were scrubbed, dried, and collected as described in the first paragraph of Example 1, and the desired material isolated by fractionation. The fractional distillation yielded 24.8 grams of difluoromethane and 10.9 grams of chlorodifluoromethane.

EXAMPLE 3

The equipment used was the same as that described in the first paragraph of Example 1 except that the packing was removed from the Vycor tube. Dichlorodifluoromethane and chlorodifluoromethane were produced simultaneously by passing a mixture of difluoromethane (19 grams) and chlorine (58 grams) through the tube, heated to about 350° C., at such a rate that the contact time was about 18 seconds. The chlorination products were collected, and yielded, upon fractionation, chlorodifluoromethane (0.3 gram) and dichlorodifluoromethane (24.9 grams).

EXAMPLE 4

A series of chlorinations was conducted in order to compare the effect of changing the temperature and contact time, as well as the ratio of chlorine to difluoromethane, upon the reaction. The results of these chlorinations are presented in the table, below. Chlorination was conducted according to the procedure described in the first paragraph of Example 1. In the table, the temperature, the contact time, the mol ratio of chlorine to difluoromethane, and the per cent conversion (determined by titrating the HCl formed in the course of the chlorination, and assuming all the HCl to have been formed in the production of dichlorodifluoromethane) of the difluoromethane are presented. The figures in the table which represent per cent conversion are 100 times the mols of HCl identified divided by 2 times the mols of difluoromethane charged.

*Table*

| Temperature of Vycor Tube in °C. | Contact Time in Seconds | Mol Ratio of Chlorine to Difluoromethane | Percent Conversion of Difluoromethane |
|---|---|---|---|
| 350 | 18 | 2.2 | 77 |
| 300 | 31 | 1.3 | 73 |
| 250 | 34 | 2.2 | 66 |
| 200 | 39 | 1.3 | 16 |
| 50 | 57 | 2.2 | 29 |

Having described the invention, we claim:

1. A method of producing dichlorodifluoromethane which comprises passing a stream of a vapor phase mixture of difluoromethane and from 50 to 500 mol per cent thereof of molecular chlorine, the mixture being initially supplied as such, through a zone heated to a temperature between about 100° C. and about 400° C. using a contact time of from 1 to 25 seconds, and separating dichlorodifluoromethane from the effluent product.

2. A method according to claim 1 wherein the molar ratio of chlorine to difluoromethane is from 1:1 to 2.5:1.

3. A method according to claim 2 wherein the molar ratio of chlorine to difluoromethane is about 2.2:1.

4. A method according to claim 2 wherein the temperature is from 300° to 400° C.

ROBERT P. RUH.
RALPH A. DAVIS.

References Cited in the file of this patent

UNITED STATES PATENTS

| Number    | Name          | Date          |
|-----------|---------------|---------------|
| 2,407,129 | Bening et al. | Sept. 3, 1946 |
| 2,459,767 | Calfee et al. | Jan. 18, 1949 |

OTHER REFERENCES

Henne et al., Jour. Amer. Chem. Soc., vol. 61, pp. 938–39 (1939).